Oct. 25, 1960     E. E. HOOD ET AL     2,957,559
SEMI-AUTOMATIC TWO-SPEED HUB AND BACK-PEDALLING
BRAKE FOR VELOCIPEDES AND THE LIKE
Filed Sept. 4, 1958

WITNESS:
Esther M. Stockton

INVENTOR.
Edwin Elliott Hood
Hollis K. Gleasman
BY Clinton S. Janes
ATTORNEY

United States Patent Office 2,957,559
Patented Oct. 25, 1960

2,957,559

SEMI-AUTOMATIC TWO-SPEED HUB AND BACK-PEDALLING BRAKE FOR VELOCIPEDES AND THE LIKE

Edwin Elliott Hood and Hollis K. Gleasman, Elmira, N.Y., assignors to The Bendix Corporation, a corporation of Delaware Filed Sept. 4, 1958, Ser. No. 759,054

10 Claims. (Cl. 192—6)

The present invention relates to a semi-automatic two-speed hub and back-pedalling brake for velocipedes and the like, and more particularly to such a two-speed transmission in which the shift from one ratio to the other is accomplished by a slight backward rotation of the driving member.

In semi-automatic variable speed gearing of the above type it is desirable to prevent the shift of gear ratio from taking place responsive to a mere cessation of pedalling or coasting by the operator. There is also an undesirable feature in some of the earlier types of devices of this character in that if the operator wheels the vehicle backward while in high gear, it may cause the brake to jam and lock the wheel against rotation.

It is an object of the present invention to provide a novel semi-automatic two-speed transmission and back-pedalling brake for velocipedes which is simple and economical in construction while being efficient and reliable in operation.

It is another object to provide such a device in which the shift from one gear ratio to the other is brought about by a slight backward movement of the driving element which is insufficient to cause application of the brake.

It is another object to provide such a device incorporating novel and simplified means for selecting the desired gear ratio.

It is another object to provide a device incorporating means for preventing application of the brake responsive to backward rotation of the wheel hub.

Further objects and advantages will be apparent from the following description taken in connection with the accompanying drawing in which.

Figure 1:
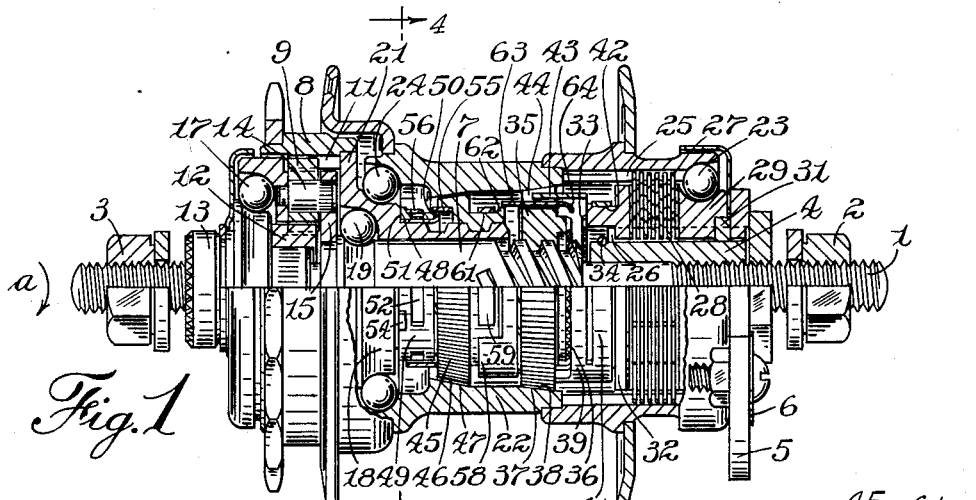
Fig. 1 is a side elevation, partly broken away and in section, of a preferred embodiment of the invention showing the parts in the positions assumed while operating in low gear.

In Fig. 1 of the drawing there is illustrated an axle 1 adapted to be clamped in the rear fork of the frame of a bicycle, not illustrated, by means of clamp nuts 2, 3. A brake anchor member 4 is threaded on the axle and is prevented from rotation by means of an anchor arm 5 non-rotatably mounted thereon and having a clip 6 adapted to be attached to the frame of the vehicle.

A low speed screw shaft 7 is journalled on the axle 1, and is arranged to be rotated from a driving member 8 by means of reduction gearing including planet pinions 9 meshing in an orbit gear 11 formed in the interior of the driving member 8. Pinions 9 engage a sun-gear 12 rigidly mounted on a bearing member 13 threaded on the axle 1 and arranged to be non-rotatably clamped to the frame of the vehicle by means of the clamp nut 3. The planets 9 are rotatably mounted on pins 14 fixed in a planet carrier cage 15 rigidly mounted on the end of the low speed screw shaft 7 and piloted on the bearing member 13 by means of bearing 17.

A high speed screw shaft 18 is rotatably mounted on the low speed screw shaft 7 by means of bearing 19 and is formed with a coupling flange 21 rigidly mounted in the driving member 8 whereby the high speed screw shaft is connected to rotate with said driving member.

A wheel hub 22 is rotatably mounted at its ends on the anchor member 4 and coupling flange 21 by means of bearings 23 and 24, respectively. The hub 22 is provided interiorly with splines 25, the anchor member 4 is also splined as indicated at 26, and brake discs 27 and 28 are splined alternately to the hub and anchor members. An abutment plate 29 is splined on the anchor member 4, serving as a support for the hub bearing 23 and forming an abutment for the brake discs 27, 28, being retained on the anchor member by means of a split thrust ring 31. A pressure plate 32 having dentils 33 formed on one side thereof is also splined on the anchor member 4 in contact with the pack of brake discs and is retained by a lock ring 34.

A low speed clutch nut and brake applying member 35 is threaded on the low speed shaft 7 and formed with dentils 36 adapted to cooperate with the dentils 33 on the pressure plate 32. Said nut has a conical peripheral surface 37 movable into and out of engagement with a corresponding clutch surface 38 in the hub 22.

Means for insuring traversal of the low speed clutch nut 35 responsive to rotation of the low speed screw shaft 7 is provided comprising a low speed retarder sleeve 39 having circumferentially extending arms 41 bearing frictionally in a groove 42 in the pressure plate 32, and having axially extending arms 43 slidably received in axial slots 44 formed in the periphery of said nut.

A high speed clutch nut 45 is threaded on the high speed screw shaft 18 and is formed with a conical surface 46 adapted to engage a corresponding surface 47 in the interior of the hub 22.

Figures 2, 4:
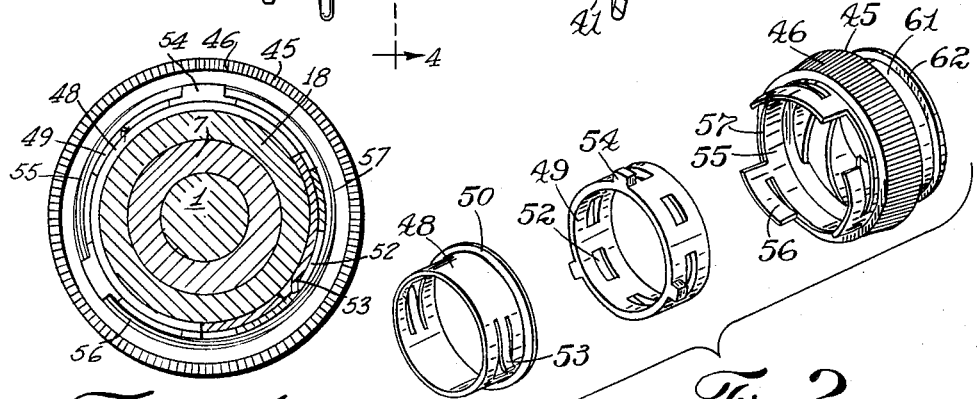
Fig. 2 is an exploded detail view of the pawl indexing sleeve, the ratchet selector ring and the high speed clutch nut with its detent and abutment member.
Fig. 4 is a fragmentary cross sectional view, partly broken away and on an enlarged scale, taken on a plane of line 4—4 in Fig. 1, and illustrating the operative engagement between the pawl indexing sleeve, the ratchet selector ring and the detent and abutment member.

Means are provided for optionally preventing the high speed clutch nut from engaging the hub, thereby permitting the low speed clutch nut to engage and rotate the hub through the gear reduction. For this purpose a pawl indexing sleeve 48 (Fig. 2) is fixedly mounted on the high speed screw shaft as by means of a press fit, and a ratchet selector ring 49 is journalled thereon, being retained in bearing engagement with a shoulder 51 on the high speed screw shaft by a flange 50 on said pawl sleeve. The selector ring has a plurality of equally spaced openings 52 formed therein, and the pawl sleeve 48 has one or more pawls 53 extending radially therefrom in position to engage in said openings and rotate the selector ring therewith in the forward direction. The selector ring 49 is also formed with equally spaced radially extending abutments 54. There are twice as many openings 52 as there are abutments 54 in the selector ring. As here illustrated there are six openings 52 and three abutments 54, which has been found to be a convenient arrangement, but it will be understood that the number of openings and abutments may be such as desired so long as the two to one ratio is maintained.

A detent and abutment member 55 is rigidly mounted on the high speed clutch nut 45 in any suitable manner and is provided with projecting circumferentially extending abutment arms 56, which are arranged to engage the abutments 54 on the selector ring 49, when in registry therewith, and thereby prevent the high speed clutch nut from engaging the hub. The arms bear frictionally upon the exterior surface of the selector ring 49 to resist relative rotation of said ring. There are the same number of arms 56 as there are abutments 54 on the selector ring, and the arms are equally spaced circumferentially, the spaces 57 between the arms being somewhat wider than the abutments 54 whereby said abutments may enter the spaces when the selector ring 49 is so indexed as to bring the abutments in registry therewith.

Figure 3:
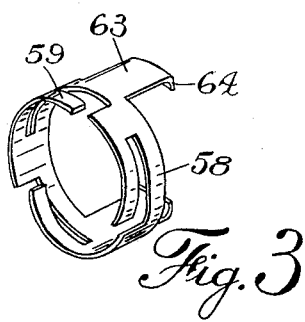
Fig. 3 is a detail in perspective of the high speed retarder sleeve.

Means are provided for retarding rotation of the high speed clutch nut 45 in order to insure its traversal responsive to rotation of the high speed screw shaft 18. As shown in Fig. 3 this means is in the form of a retarder sleeve 58 having circumferentially extending spring arms 59 bearing on a cylindrical surface 61 of the high speed clutch nut 45 and retained thereon by a peripheral flange 62 so as to form a swivel connection with said nut. The retarder sleeve 58 also has axially extending arms 63 slidably engaging in the slots 44 in the low speed control nut 35 to form a spline connection therewith.

With the structure so far described, if the transmission is in high gear, with the high speed clutch nut 45 in engagement with the hub, and the vehicle is rolled backward, the elements of the transmission will be rotated backward by the hub. Since the backward rotation of the low speed clutch nut 35 is resisted by the low speed retarder sleeve 39, the backward rotation of the low speed screw shaft will then traverse said nut 35 into engagement with the pressure plate 32 and compress the brake discs 27, 28. Due to the leverage of the wheel on the hub, compounded by the gear reduction of the transmission, the brake may be jammed so tightly as to become difficult to release.

In order to prevent the engagement of the low speed clutch nut 35 with the pressure plate 32 at such times as the high speed clutch nut is in contact with the hub, the high speed retarder sleeve 58 is so formed as to limit the separation of said clutch nuts. For this purpose, the axially extending arms 63 on the high speed retarder sleeve have their terminal portions bent inwardly as shown at 64 so as to hook over the low speed clutch nut 35, limiting withdrawal of said arms 63 from the slots 44.

In the above described situation therefore, as soon as the travel of the low speed clutch nut is so arrested, said nut, and its retarder sleeve 39 rotate backward with the low speed screw shaft, permitting the vehicle to be rolled backward without applying the brake.

It will be understood that the hooks 64 do not interfere with the normal application of the brake by backward rotation of the driving member 8 relative to the hub 22. When the operator back-pedals, the high speed clutch nut is traversed to the right in Fig. 1 faster than the low speed clutch nut, and therefore leaves the latter free to perform its brake-applying function in the usual manner.

In operation, starting with the parts in the positions illustrated in Fig. 1, since at this time the engaging movement of the high speed clutch nut 45 has been arrested by engagement of the arms 56 of the abutment member against the abutments 54 of the selector ring, forward rotation of the driving member 8 in the direction of the arrow (a) will cause the low speed screw shaft 7 to traverse the low speed clutch nut 35 into engagement with the hub whereby the hub is rotated at low speed.

When it is desired to operate in high gear, the driving member 8 is rotated backward slightly causing the screw shafts 7, 18 to also be rotated backwards, whereupon the pawl indexing sleeve 48 being fixedly secured to the high speed screw shaft 18 rotates backward.

Since backward rotation of the high speed clutch nut 45 is resisted by retarder sleeves 58 and 39, the frictional drag of the arms 56 of the detent and abutment member 55 mounted thereon prevent initial backward rotation of the selector ring 49, and the pawls 53 of the pawl indexing sleeve 48 click over from one opening 52 in the ratchet selector ring to the next. On subsequent forward rotation of the driving member, the pawls 53 of indexing sleeve 48 contact the ends of the openings 52 in which they are engaged rotatably displacing the indexing sleeve 48 in advance of the axially approaching detent and abutment member 55 and against the frictional drag exerted by the arms 56 thereby properly positioning the ratchet selector ring 49 so as to bring its abutments 54 into registry with the spaces 57 between the arms 56. The high speed clutch member is thereby enabled to engage the hub 22 and rotate it at the same speed as the driving member 8.

When it is desired to shift down again into low gear, a repetition of the operation causes the ratchet selector ring to be indexed again into position where its abutments register with the arms 56 and consequently prevent engagement of the high speed clutch. Forward rotation of the driving member will then be transmitted to the hub through the reduction gearing and low speed clutch.

Application of the brake is accomplished in the usual manner by further backward rotation of the driving member 8 whereby the low speed clutch nut 35 engages the pressure plate 32 to compress the brake discs 27, 28.

Although but one form of the invention has been shown and described in detail it will be understood that changes may be made in the design and arrangement of the parts without departing from the spirit of the invention.

We claim:

1. In a two-speed hub transmission and back-pedalling brake for velocipedes and the like, a fixed axle, a brake anchor member non-rotatably mounted thereon, a low speed screw shaft journalled on the axle, a high speed screw shaft rotatably mounted on the low speed shaft, a hub rotatably mounted on the anchor member and the high speed shaft, means for rotating the hub including gearing connecting the high speed and low speed shafts, a low speed clutch nut threaded on the low speed screw shaft for traversal into and out of driving engagement with the hub, means including a low speed retarder sleeve for frictionally resisting rotation of the low speed clutch nut to ensure its traversal responsive to rotation of its screw shaft, a high speed clutch nut threaded on the high speed screw shaft and a high speed retarder sleeve frictionally connecting the high speed clutch nut to the low speed clutch nut to cause traversal of the high speed clutch nut into and out of driving engagement with the hub responsive to rotation of the high speed screw shaft, said high speed retarder sleeve having a swivel connection to the high speed clutch nut and a spline connection to the low speed clutch nut, and comprising means engaging the low speed clutch nut to limit the axial separation of said nuts.

2. A device as set forth in claim 1 including further braking means operable to frictionally connect the hub to the anchor member, means for actuating the braking means by traversal of the low speed clutch nut responsive to backward rotation of its screw shaft, said means for limiting the axial separation of the clutch nuts being arranged to prevent the low speed clutch nut from actuating the brake when the high speed clutch nut is positioned to engage the hub.

3. A device as set forth in claim 2 in which the high speed retarder sleeve is provided with a plurality of circumferentially extending arms, and the high speed clutch nut is formed with a peripheral surface on which said arms frictionally engage and a flange cooperating with said arms to form the swivel connection between said high speed retarder sleeve and the high speed clutch nut.

4. A device as set forth in claim 2 in which the high speed retarder sleeve is formed with a plurality of axially extending arms, and the low speed clutch nut is formed with a plurality of axial slots slidably receiving said arms to form the splined connection therebetween, said arms being formed with inwardly bent terminal portions for limiting withdrawal thereof from said slots and arresting the axial travel of the low speed nut towards the braking means.

5. In a two-speed hub transmission and back-pedalling brake for velocipedes and the like, a fixed axle, a brake anchor member non-rotatably mounted thereon, a low speed screw shaft journalled on the axle, a high speed screw shaft rotatably mounted on the low speed shaft, a hub rotatably mounted on the anchor member and the high speed shaft, means for rotating the hub including gearing connecting the high speed and low speed shafts, a low speed clutch nut threaded on the low speed screw shaft for traversal into and out of driving engagement with the hub, means including a low speed retarder sleeve for frictionally resisting rotation of the low speed clutch nut to ensure its traversal responsive to rotation of its screw shaft, a high speed clutch nut threaded on the high speed screw shaft, means for frictionally resisting rotation of the high speed clutch nut to cause its traversal into and out of clutching engagement with the hub responsive to rotation of its screw shaft, and means selectively operable to prevent the high speed clutch nut from engaging the hub including a pawl sleeve fixedly mounted on the high speed screw shaft, a ratchet selector ring journalled on the pawl sleeve having circumferentially spaced radially extending abutments thereon, and a detent and abutment member rigidly mounted on the high speed clutch member frictionally connecting it to said selector ring, said detent member having equally spaced circumferentially extending abutments adapted to be brought into and out of registry with the radially extending abutments on said ratchet ring.

6. A device as set forth in claim 5 in which the selector ring is formed with equally spaced circumferentially arranged ratchet sockets for reception of a pawl on the pawl sleeve, there being twice as many sockets as said radially extending abutments on the selector ring, whereby indexing said selector ring by means of the pawl and ratchet connection brings said radially extending abutments on the selector ring into and out of registry with the circumferentially extending abutments on said detent member.

7. A device as set forth in claim 6 in which said detent member connecting the high speed clutch nut to the selector ring comprises a sleeve rigidly attached to the high speed clutch nut having the same number of equally spaced laterally extending arms bearing frictionally on said selector ring as there are radially extending abutments on said ring; indexing of the selector ring being arranged to bring the radially extending abutments thereon in registration alternately with the arms on said detent member and with the spaces therebetween.

8. In a two-speed hub transmission and back-pedalling brake for velocipedes and the like, means including a fixed axle supporting the transmission and brake, a first screw shaft journalled on the axle, a second screw shaft rotatably mounted on the first screw shaft, a hub rotatably mounted relative to said screw shafts, means for rotating the hub including gearing connecting the first and second screw shafts, a first clutch nut threaded on the first screw shaft, a second clutch nut threaded on the second screw shaft, retarder sleeve means for yieldingly resisting rotation of said clutch nuts to cause their traversal into and out of driving engagement with the hub responsive to rotation of their respective screw shafts, and said retarder sleeve means having other means limiting the amount of axial separation between said clutch nuts.

9. In the device set forth in claim 8 said retarder sleeve means comprising a first retarder sleeve having a splined connection to the first clutch nut and frictionally bearing on the supporting means, and a second retarder sleeve having a swivel connection to the second clutch nut and a spline connection to the first clutch nut.

10. The device set forth in claim 9 in which the first clutch nut is formed with a plurality of axial notches, and the second retarder sleeve is formed with a plurality of axially extending arms slidably received in said notches to form the splined connection therebetween; and said other means comprising an inwardly bent terminal portion on said arms preventing the withdrawal thereof from said axial notches and arresting the axial travel of said first clutch nut away from said second clutch nut.

References Cited in the file of this patent

UNITED STATES PATENTS

| | | |
|---|---|---|
| 2,376,042 | English | May 15, 1945 |
| 2,837,187 | Hood | June 3, 1958 |
| 2,865,478 | Hood | Dec. 23, 1958 |